UNITED STATES PATENT OFFICE.

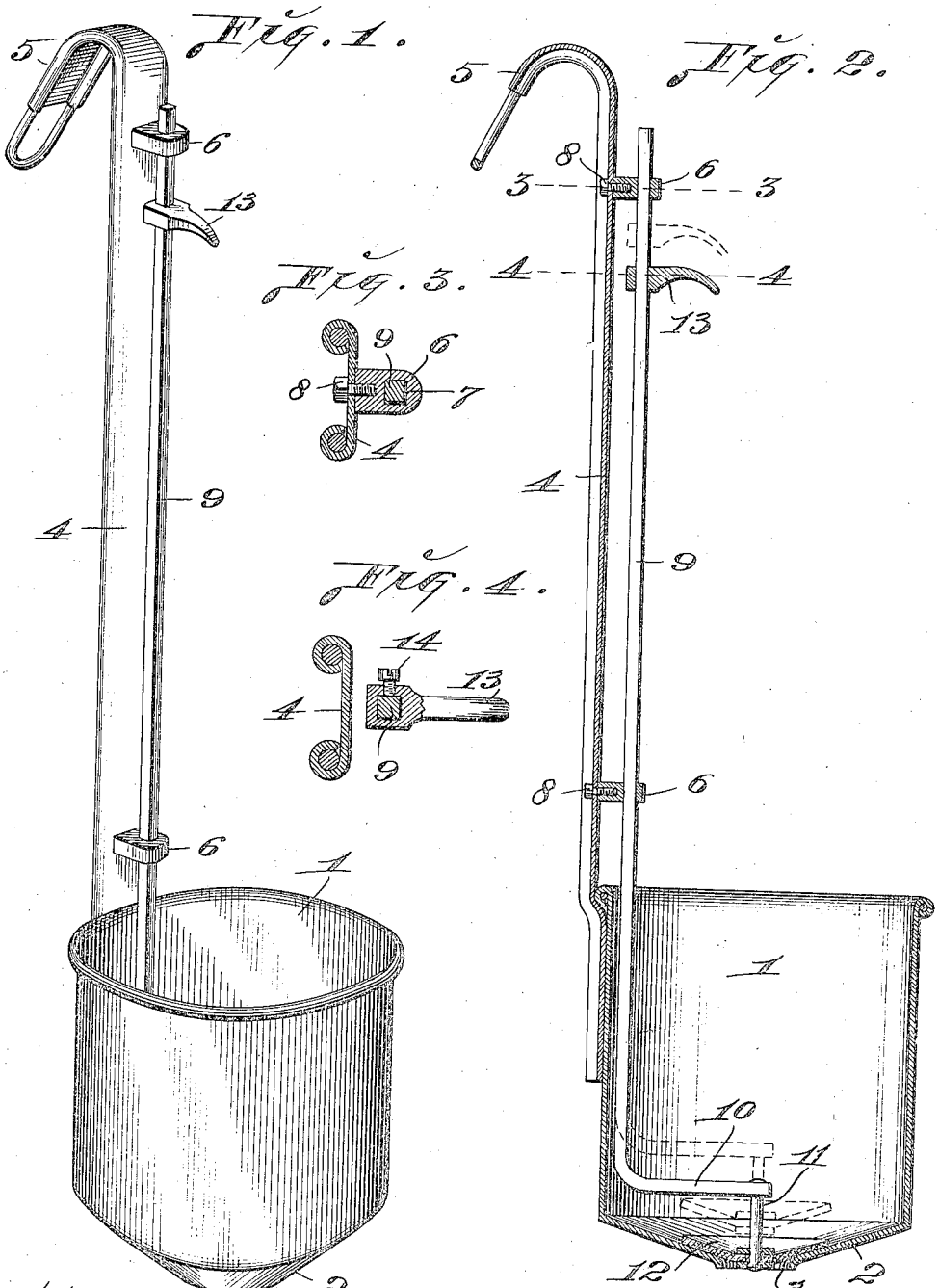

EUGENE BURKINS, OF ST. LOUIS, MISSOURI, ASSIGNOR OF ONE-SEVENTH TO J. W. McCLELLAN, ONE-SEVENTH TO THOS. F. ERWIN, ONE-SEVENTH TO BISMARCK LAVINE, ONE-SEVENTH TO U. S. BOLEN, ONE-SEVENTH TO GEO. McD. WRIGHT, AND ONE-SEVENTH TO W. J. RODGERS, OF ST. LOUIS, MISSOURI.

MILK-DIPPER.

No. 821,700.　　　Specification of Letters Patent.　　　Patented May 29, 1906.

Application filed July 1, 1905. Serial No. 267,990.

*To all whom it may concern:*

Be it known that I, EUGENE BURKINS, a citizen of the United States, and a resident of St. Louis, Missouri, have invented certain new and useful Improvements in Milk-Dippers, of which the following is a specification containing a full, clear, and exact description, reference being had to the accompanying drawings, forming a part hereof.

My invention relates to a milk-dipper; and the object of my invention is to construct a simple and inexpensive device to be used in dipping milk from milk-cans, and which device is provided with means for readily discharging the milk from the cup into a bottle, glass, or other receptacle.

A further object of my invention is to provide a milk-dipper with a gravity-valve, which when opened will allow the milk to discharge from the bottom of the dipping-cup and which will automatically close when released, thereby shutting off the discharge of milk from the cup.

In the drawings, Figure 1 is a perspective view of a milk-dipper of my improved construction. Fig. 2 is a vertical section taken through the center of the dipper. Fig. 3 is a horizontal section taken on the line 3 3 of Fig. 2. Fig. 4 is a horizontal section taken on the line 4 4 of Fig. 2.

Referring by numerals to the accompanying drawings, 1 indicates a cup of suitable size and form provided with a flat funnel-shaped bottom 2, in the center of which is a discharge-aperture 3. Rigidly fixed to the outside of the dipper 1 is the lower end of a handle 4, that extends upwardly from the cup a suitable distance, the upper end of said handle being bent downwardly to form a hook 5. Guide-blocks 6, provided with vertically-arranged rectangular apertures 7, are positioned against the front face of the handle 4 and are held thereon by means of set-screws 8, that pass through the handle 4 into the rear ends of said blocks. One of these blocks is positioned near the upper end of the handle 4, and the other one is positioned just above the top of the cup 1. Arranged to move vertically through the apertures in these guide-blocks is a square rod 9, that extends downwardly into the cup 1, and its lower end is bent laterally, as indicated by 10, and extends to a point directly over the center of the discharge-aperture 3 in the bottom of the cup. Depending from the outer end of this portion 10 is a stem 11, that carries on its lower end a disk valve 12, of rubber, leather, or analogous material. This valve is considerably larger than is the discharge-aperture 3, and when said valve is normally seated on the bottom 2 it very effectually closes the passage through said opening 3.

The vertical portion of the rod 9 slides freely through the apertures 7 of the guide-blocks 6, and adjustably positioned upon said rod, just beneath the upper guide-blocks 6, is a finger-engaging hook 13, the same being held in position by means of a set-screw 14, that passes through one side of said hook and bears on one of the side faces of the rod 9.

In the use of my improved milk-dipper the cup 1 is inserted through the mouth of a milk-can and is moved downwardly therein by means of the handle 4 until said cup is filled with milk. The dipper is now drawn upwardly out of the milk-can, and the bottle, glass, or other receptacle into which it is desired to place the milk is positioned immediately beneath the discharge-aperture 3 in the bottom of the cup. The index-finger of the person's hand that is manipulating the dipper is now engaged beneath the hook 13, and by an upward pressure of said finger the rod 9 and valve 12 are elevated to the position seen by dotted lines in Fig. 2. This movement unseats the valve and allows the milk within the cup 1 to discharge through the opening 3 into the receptacle beneath said cup. When the proper amount of milk has been allowed to discharge into the receptacle, the operator merely removes his finger from beneath the hook 13, and by reason of its weight the rod will instantly return to its normal position and the valve will be reseated and close the passage through the aperture 3.

Heretofore it has been the practice in constructing milk-dippers to make a cup with an imperforate bottom, and where a dipper of this kind is used the entire handle and cup must be swung or moved into such a position as that the milk may be poured out of said cup, and this action is very unhandy where it is desired to discharge the milk into a small-mouthed receptacle, such as a bottle or small glass. My improved construction readily overcomes this difficulty, and a very simple, inexpensive, and efficient dipper is provided.

While my improved device is especially adapted for dipping milk from small-mouthed milk-cans, it will be readily understood that it can be advantageously used wherever it is desired to dip up a liquid and transfer the same to a small receptacle, such as a bottle or glass.

I claim—

In a milk-dipper, a cup having a centrally-arranged discharge-opening in its bottom, a handle fixed to and extending upwardly from one side of said cup, a hook formed at the upper end of said handle, a pair of vertically-alined blocks detachably secured to the handle which blocks are provided with square openings, a square rod operating through the openings in said blocks and extending downwardly into the cup, the lower end of which rod is bent laterally, a pin carried by the outer end of the laterally-bent end, a flexible disk carried by the lower end of the pin and adapted to normally close the opening in the bottom of the cup, a finger-hold provided at one end with a square opening and arranged to be vertically adjusted upon the upper portion of the square rod, and a set-screw passing through the end of the finger-hold to lock it on said rod; substantially as specified.

In testimony whereof I have signed my name to this specification in presence of two subscribing witnesses.

EUGENE BURKINS.

Witnesses:
M. P. SMITH,
E. M. HARRINGTON.